May 11, 1965 J. F. McCRORY 3,183,481
AUTOMATIC TIRE TREAD GAUGE
Filed Nov. 14, 1962 4 Sheets-Sheet 1

INVENTOR.
JOHN F. McCRORY
BY

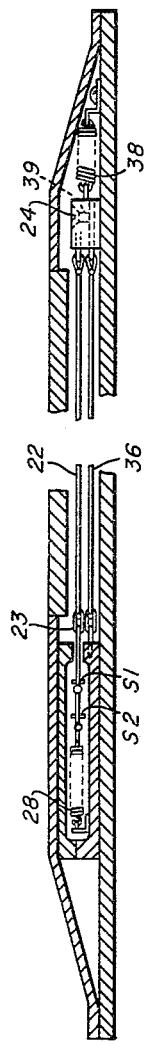
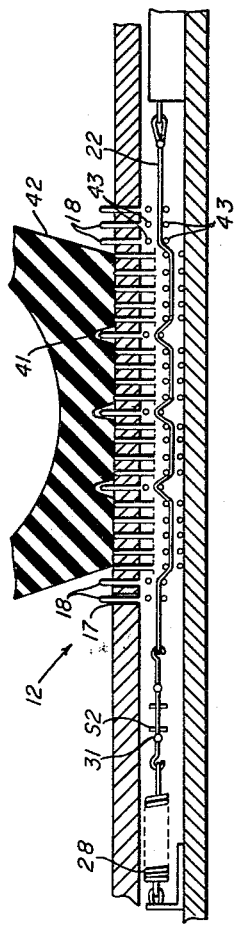
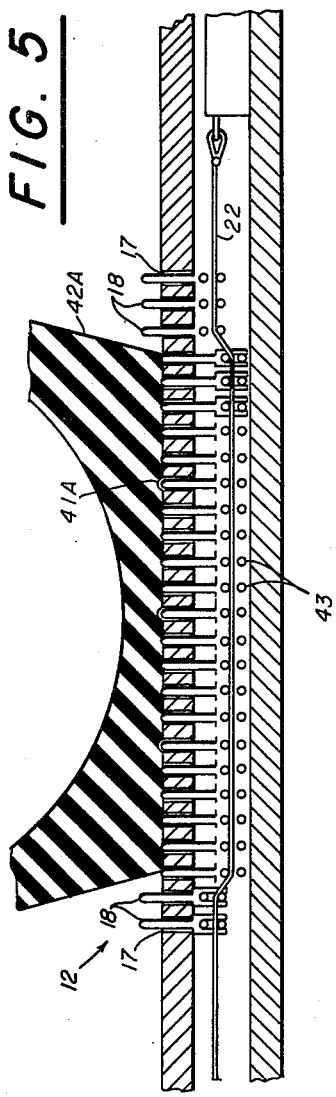

INVENTOR.
JOHN F. McCRORY

INVENTOR.
JOHN F. McCRORY

United States Patent Office 3,183,481
Patented May 11, 1965

3,183,481
AUTOMATIC TIRE TREAD GAUGE
John F. McCrory, Chula Vista, Calif., assignor of two and one-half percent to Verda Allen, San Diego, Calif., and five percent to David J. Ward and Betty M. Ward, San Diego, Calif.
Filed Nov. 14, 1962, Ser. No. 237,654
9 Claims. (Cl. 340—52)

This invention relates generally to an automatic tire tread gauge and more particularly to an automatic tire tread gauge in which the tread condition is automatically sensed and indicated regardless of the tread width.

As set out in my co-pending application for U.S. Letters Patent Serial 184,350, filed April 2, 1962, now Patent No. 3,122,085, for tire tread gauge, the prior art tire tread measuring devices are generally limited to visual sighting or manually operated tread-depth gauges. These have the obvious disadvantage of inaccuracy in the visual sighting case and cumbersomeness in the manual gauge variety. Furthermore, attempts to automate the sensing and indicating of tread depth of tires such as the system described and claimed in the above-mentioned co-pending application have met with difficulties due to the variations in the tire tread and/or wheel-track width on different types of vehicles. This has necessitated complex mechanisms, with the disadvantages inherent in complexity, for compensating the system for these variances.

According to the invention, a pair of probe plates are provided which are spaced and dimensioned to accommodate any variance of tread width or track width between the left and right sets of wheels. Each plate over which the wheels travel has a series of spring-loaded probes which emerge through apertures in the plates. The probes are spring-loaded to go up through the apertures and are pushed down by the wheels rolling over them. A cord-line, mechanically coupled to the probes, is displaced by an amount dependent upon whether or not one or more probes find tread grooves. Associated circuitry activated by the cord line senses the probe depth and indicates whether or not it is greater or less than a predetermined safe tread-depth level. An automatic timer switches the indicator circuits from front to rear in less than the time that it takes for the car to completely pass over a given probe plate. Thus, with a pair of probe plates, a four wheel indication of the condition of the tire treads is given.

It is thus an object of the present invention to provide an automatic tire tread depth gauge with provisions for the indication of the tire tread depths for a four wheel vehicle.

Another object of the present invention is the provision of an automatic tire tread depth gauge which can be utilized for sensing and indicating the tread depth condition of any tire regardless of tread width.

A further object of the invention is a provision of an automatic tire tread depth gauge in which the tread depth of all four tires of a four wheeled vehicle is automatically indicated regardless of the track width between the left and right sets of wheels.

Yet another object of the present invention is to provide an automatic tire tread depth gauge which requires a minimum of maintenance and calibration.

A still further object of the present invention is a provision of an improved automatic tire tread depth gauge which is compact, simple to install and relatively inexpensive.

A still further object of the present invention is to provide an automatic tire tread depth gauge in which a predetermined unsafe depth of tire tread grooves is automatically indicated for each wheel of a four wheel vehicle.

Other objects and many of the attendant advantages of the present invention will be readily appreciated as the same becomes better understood by reference to the following detailed description when considered in connection with the accompanying drawings wherein:

FIG. 3 is a side view of the tread depth sensing probe enclosure of FIG. 1.

FIG. 4 is a view of a portion of the tread depth sensing enclosure of FIG. 1 showing the entrance of probes into tire tread grooves with the resultant displacement of the tread line.

FIG. 5 shows a view of a portion of the tread depth sensing probe enclosure of FIG. 1 showing the probe positions within a tire having less tread depth than FIG. 5 and the resultant cord line displacement.

Figures 1, 2:
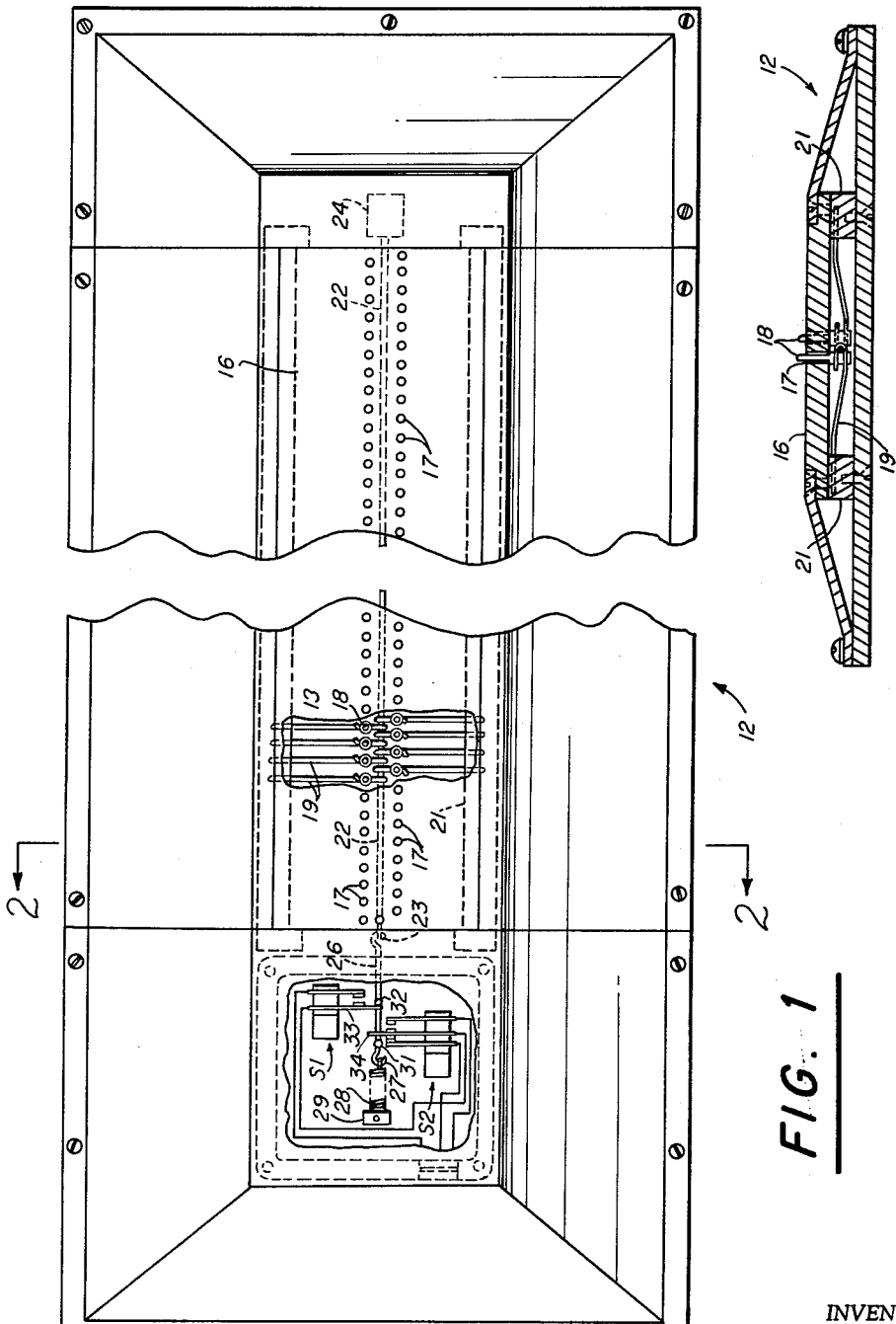
FIG. 1 is a plan view partially broken out of one of the two tread depth sensing probe enclosures.
FIG. 2 is a sectional view of FIG. 1 taken along lines II—II.

Referring to FIG. 1 there is shown generally probe plate 12 having cover plate 16 with apertures 17. Spring-loaded probes 18 are positioned directly under apertures 17 and mounted by springs 19, which in turn are mounted in mounting block 21. Cord line 22 is connected between hook 23 and block 24. Hook 23 is connected by line 26 to hook 27, hook 27 is connected by spring 28 to block 29. Switch actuating cams 31 and 32 are mounted on line 26. Switches S1 and S2 are mounted with line 26 threaded through leaf contacts 33 and 34 respectively.

Referring to FIG. 2 the probes 18 are shown connected to springs 19 which in turn are mounted in mounting blocks 21.

Referring to FIG. 3 cord-line 22 is shown between hook 23 and mounting block 24, cord-line 36 is mounted under cord-line 22 between mounting block 37 and mounting block 24. Mounting block 24 is secured by spring 38, and line 36 is slidably mounted within block 24 by set screw 39.

Referring to FIG. 4 probes 18 are shown emerging through apertures 17 into tread groove 41 of tire 42. Cord-line 22 is shown passing through guide loops 43 which are a part of springs 19.

Referring to FIG. 5 there is shown probes 18 passing through apertures 19 into tread grooves 41a of tire 42a. Again, cord-line 22 passes through guide loops 43.

Figure 6:
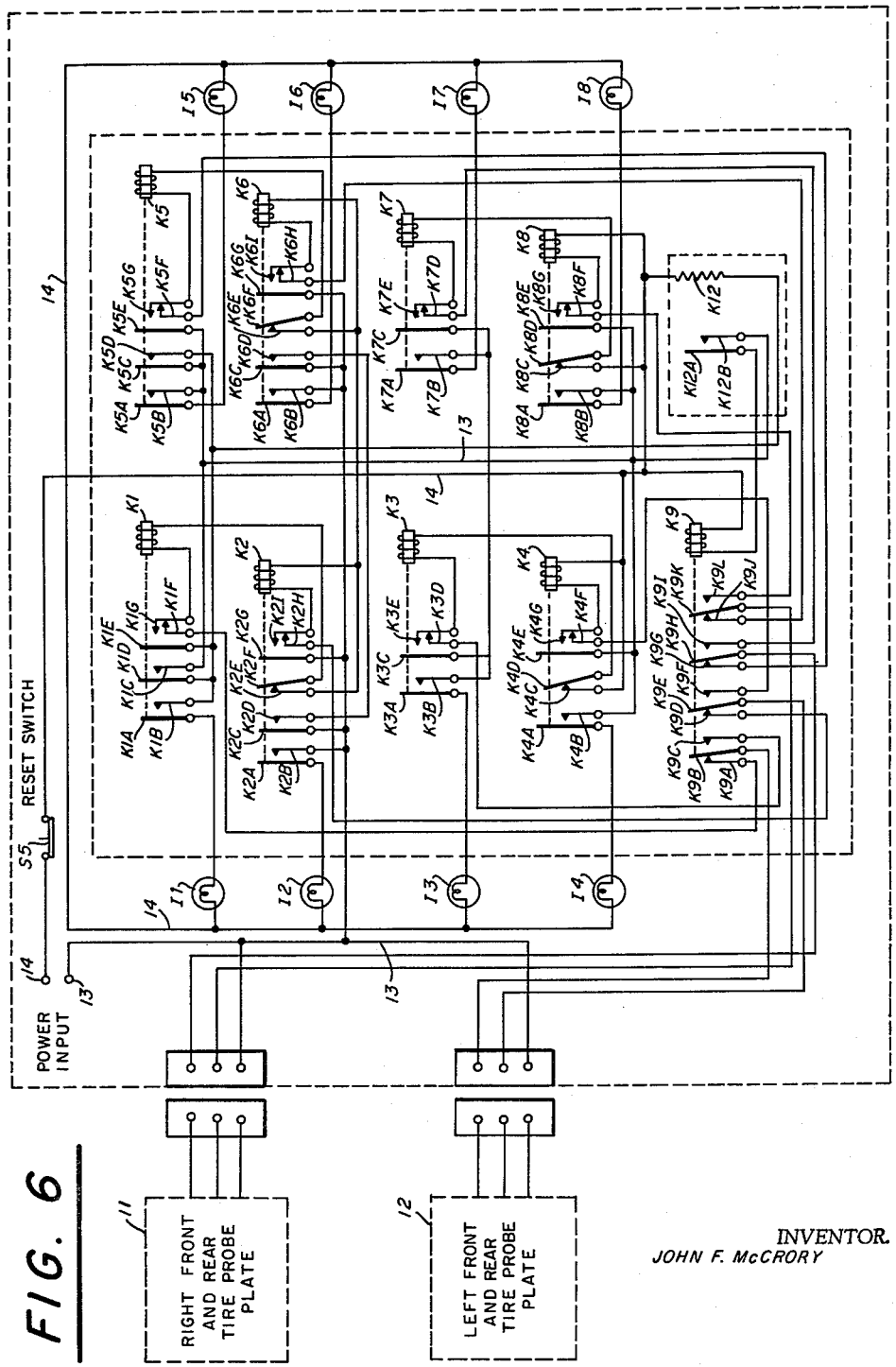
FIG. 6 is a schematic representation of the electrical circuitry of the present invention.

Referring to FIG. 6 there is shown right, front-and-rear tire probe plate 11 and left-front-and-rear tire probe plate 12 with their associated switches S3 and S4, and S1 and S2, respectively. Relay K1 has associated contacts K1A, K1B, K1C, K1D, K1E, K1F, and K1G, relay K2 has associated contacts K2A, K2B, K2C, K2D, K2E, K2F, K2G, K2H and K2I, relay K3 has associated contacts K3A, K3B, K3C, K3D, K3E, relay K4 has associated contacts K4A, K4B, K4C, K4D, K4E, K4F, and K4G, relay 5 has associated contacts K5A, K5B, K5C, K5D, K5E, K5G, and K5F, relay K6 has associated contacts K6A, K6B, K6C, K6D, K6E, K6F, K6G, K6H, and K6I, relay K7 has associated contacts K7A, K7B, K7C, K7D, and K7E, relay K8 has associated contacts K8A, K8B, K8C, K8D, K8E, K8F, and K8G, relay K9 has associated contacts K9A, K9B, K9C, K9D, K9E, K9F, K9G, K9H, K9I, K9J, K9K and K9L, and thermal timer K12 has associated contacts K12A and K12B. Indicator Light I1 receives its power through K1A and K1B of relay K1. Indicator light I2 receives its power through contacts K2A and K2B of relay K2. Indicator light I3 receives its power through contacts K3A and K3B of relay K3. Indicator light I4 receives its power through contacts K4A and K4B of relay K4. Indicator light I5 receives its power through contacts K5A and K5B of relay K5. Indicator light I6 receives its power through contacts K6A and K6B of relay K6. Indicator light I7 receives its power through contacts K7A and K7B of relay K7. Indicator I8 receives its power through contacts K8A and K8B of relay K8. Thus, there is an associated relay with each indicator light. Each of the relays associated with one of the indicator lights receives its solenoid actuating current through a contact of K9. In the position shown K9 supplies actuating current to the front tire indicator light relays which are K1, K2 and K5 and K6. When any one of these relays is actuated thermal timer K12 is also actuated and contacts K12A and K12B of thermal timer K12 are closed after a predetermined time. This serves to actuate relay K9 which then supplies current to the rear indicator light relays K3, K4, K7 and K8. It is pointed out here all of the relays associated with a separate indicator light also received power through appropriate contacts of the switches in the tire probe plates 11 and 12. Reset switch 5 clears the board after an indication is made since all of the indicator relays have holding contacts associated therewith. Switch S5 can be a manually operated push button type switch or alternatively an automatic timer can break the line from terminal 14 momentarily to clear the indicator board.

Figure 7:
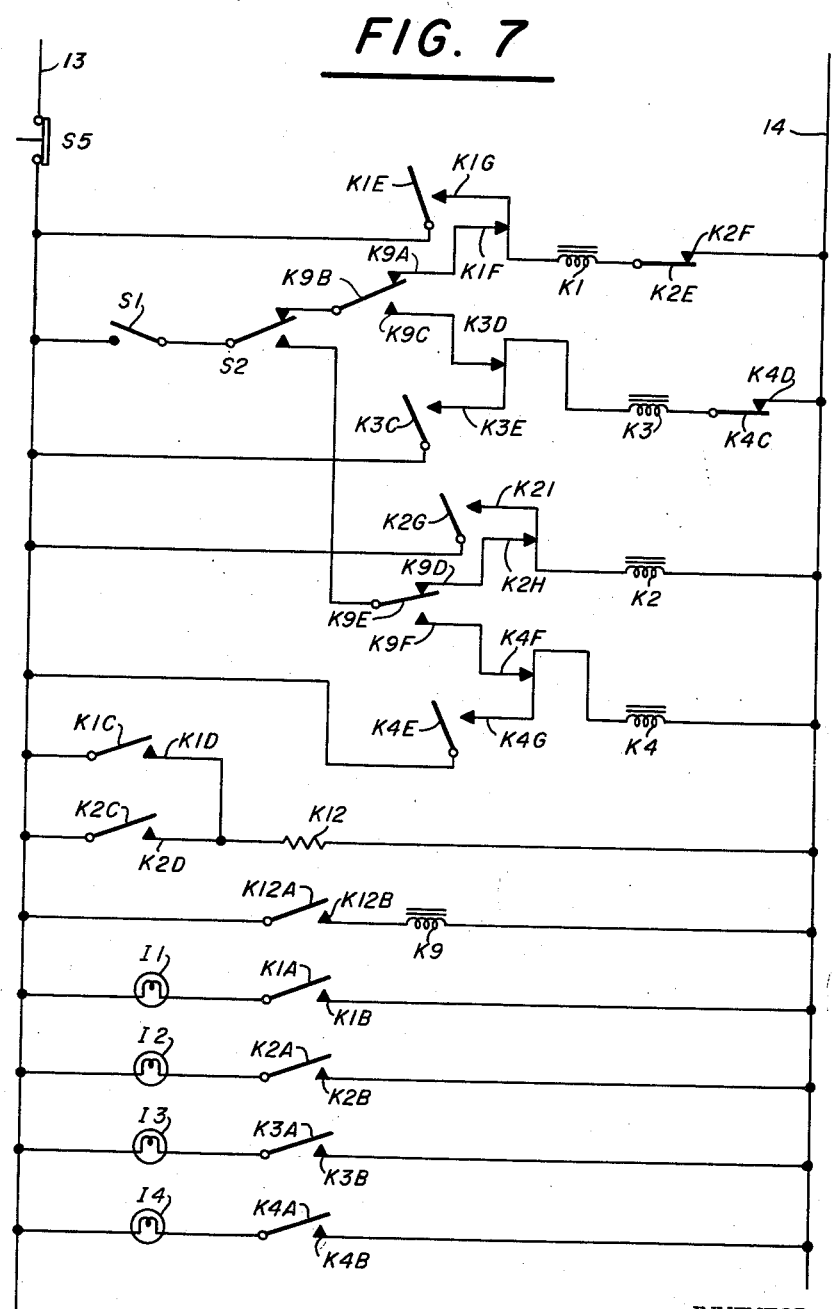
FIG. 7 is a schematic representation of a portion of the circuitry of FIG. 6.

Referring to FIG. 7 there is shown a portion of the diagram of FIG. 6 in a sequential pattern. The portion shown here is the left front and rear portion which comprises switches S1 and S2, relays K1, K2, K3, K4, K9 and K12 and their associated contacts and indicator lights I1, I2, I3 and I4. At the top of the diagram power is applied through input terminals I3 and I4 and reset switch S5 as in FIG. 6. Since switch S1 is closed by a vehicle passing over tire probe plate 12 the solenoid of K1 is energized through the back contacts of S2, back contacts K9A and K9B of relay K9, energizing-contact K1F of relay K1 and back contacts 2E and 2F of relay K2. Thus, relay K1 is energized which in turn closes contacts K1A and K1B, applying power to indicator light I1. Indicator light I1 is preferably a red light, indicating an unsafe tire condition, this red light will flash momentarily whether the tire is safe or unsafe. If the tread depth is of a predetermined level switch S2 (as will be explained) throws to the downward position energizing relay K2 through back contacts K9D and K9E of relay K9 and energizing contact K2H of relay K2. Holding contacts K2G and K2I also close, locking relay K2 into an energized position. When relay K2 is then energized contacts K2E and K2F open removing power from K1 and turning off red light indicator I1. When relay K2 is energized, contacts K2A and K2B are closed lighting indicator light I2 for a safe tread condition indication. Indicator light I2 is preferably a different color from light I1 such as green. At this time the thermal timer K12 has been energized and in a predetermined length of time, for example, a half second, contacts K12A and K12B of the thermal timer K12 close energizing relay K9. When relay K9 is energized contacts K9A and K9B open and contacts K9D and K9E open and contacts K9B and K9C and K9E and K9F close. Relay K1 or K2 however remains energized through holding contacts K1E and K1G or K2G and K2I respectively. Thus, the set of lights pertaining to the condition of the front tire stays lit and the circuit is now ready for a rear tire indication by virtue of the fact that relay K9 has been energized and its contacts now are in a position to supply energizing current to either K3 or K4. Switch S1 is then closed again by a rear tire passing over tire probe plate 12, and, depending on whether S2 is thrown or not which in turn depends upon the tread depth being above or below a predetermined level, either relay K3 or K4 will be energized in the same manner as relay windings K1 and K2. Again a back contact of relay K4 supplies energy to the solenoid of relay K3, so if K4 is thrown relay K3 cannot be energized. In this regard relay K3 indicates the warn tread condition and relay K4 will indicate the safe tread condition by virtue of their associate indicator lights I3 and I4. Holding contacts K1E, K1G, K3C, K3E, K2G, K2I, K4F, K4G of relays K1, K3, K2 and K4, respectively, make and the four energizing contacts K1F, K3D, K2H and K4F of relays K1, K3, K2 and K4, respectively, break. An identical circuit to FIG. 7 which encompasses switches S3 and S4 of tire probe plate I1 and relays K5, K6, K7, K8 and their associate contacts with lights I5, I6, I7 and I8 and contacts corresponding to the ones shown in FIG. 7 of relay K9 and timer K12 is present for the right front and rear tires.

*Theory of operation*

Referring now to FIGS. 5 and 7, prior to the tire 42A rolling over the probe plate 12, probes 18 are all pushed up through apertures 19 due to the spring biasing. It is pointed out here (with reference to FIG. 1) that apertures 19 are stagger spaced in two lines to insure probes 18 finding tread grooves of any tire passing over probe plate 12. Further, with reference to FIG. 7, it can be seen that the deflection of cord-line 22 will not vary with the tread width in the case of a smooth tire. In the case of a tire with sufficient tread, the additional deflection caused by one probe finding a tread groove, will cause cam 31 to throw switch 2S. Thus, regardless of how many probes find tread grooves, which may vary with tread width, the net result will be the same, i.e. both switches S1 and S2 will be thrown. As tire 42A rolls over probe plate 12, many of the probes as shown are forced down inside apertures 19 against their individual spring biasing. When this happens, the cord-line 22 is deflected as shown, causing spring 28 to extend causing cam 32 to close switch S1. When S1 closes, as previously pointed out with reference to FIG. 7, relay K1 is energized, closing holding contacts K1E and K1G and applying power to indicator light I1 through contacts K1A and K1B and to thermal time delay K12 through contacts K1C and K1D. Thus, the indicator light I1 is lit and will remain lit after the tire rolls off and S1 opens because of holding contacts K1E and K1G of relay K1. Indicator light I1 will then indicate the left front tire to be in an unsafe condition because of the shallowness of the tread group 41A. As the vehicle on which front tire 42A is mounted rolls on and before back tire 42 contacts probe plate 12, thermal time switch K12 closes its contacts K12A and K13 and K12B energizing relay K9. When relay K9 energizes contacts 9B and 9A open, then contacts 9B and 9C close, and contacts 9E and 9D open and contacts 9E and 9F close. When this happens, as the back tire (referring to FIG. 4) 42 moves over probe plate 12 causing deflection of cord-line 22, S1 is again closed, applying power to relay K3 through contacts K9A and K9B or C or relay K9 and contact K3D of K3 and back contacts K4C and K4D of relay K4. At this time holding contacts K3C and K3E close, locking relay K3 in a closed position. At this point, contacts K3A and K3B also close, lighting light I3, indicating an unsafe condition momentarily for the left rear tire. However, as the probes 18 in FIG. 4 find the tread grooves 41, cord-line 22 is lengthened additionally causing spring 28 to lengthen and causing cam 31 to throw switch S2. At this point, relay winding K4 is energized through S1, the bottom contact of S2, the lower contacts of K9E and K9F of relay K9, contact K4F of relay K4. When this closes, when relay K4 is energized, contacts K4E and C close, holding relay K4 energized. Also, contacts K4C and K4D open with the energization of relay K4, deenergizing relay K3, extinguishing the unsafe light for the rear tire I3 through the opening of contacts K3A and K3B and lighting light I4 indicating through contacts K4A and K4B of relay K4 indicating a safe condition of rear left tire 42.

Obviously, the probe plate 11 along with switches S3 and S4, relays K5, K6, K7, and K8, and lights I5, I6, I7, and I8, operate in the identical manner for the right front and rear wheels.

Referring to FIG. 3, there is shown cord-line 36 mounted under cord-line 22. Cord-line 36 is fix mounted in mounting block 37 and slidably mounted in mounting block 24 being set by set screw 39. Mounting block 24 is held in place by cord lines 22 and 36 and by spring 38. Spring 38 is a heavier spring than spring 28. Thus, by adjustment of set screw 39, the displacement of spring 28 can be initially set for the proper tripping actions of switches S1 and S2.

A further feature afforded through the use of cord line 36 and spring 38 is temperature compensation. If cord lines 22 and 36 should contract or expand, for example, from an ambient temperature change, spring 28 would displace throwing the entire assembly out of adjustment. However, with cord 36 mounted in the manner shown in FIG. 3, as it expands, spring 38 is allowed to take up the expansion and if cord 22 and cord 36 are identical in construction, this displacement of spring 38 will compensate automatically for the extra lengthening of cord 22, since spring 38 is the stronger of the two springs 28 and 38, leaving the entire system in calibration and compensating for temperature variations. Cord lines 28 and 38 are/can be constructed of continuous filament fiber glass to lend ruggedness and dependability to the system, and are preferably coated with suitable lubricating plastic.

It should be understood, of course, that the foregoing disclosure relates to only a preferred embodiment of the invention and that it is intended to cover all changes and modifications of the invention herein chosen for the purposes of the disclosure which do not constitute departures from the spirit and scope of the invention.

What is claimed is:

1. An automatic tire tread gauge for sensing and indicating the tread condition of tires comprising a plurality of probes positioned for entrance into one or more tread grooves of a tire on an automobile rolling over said probe means;

sensing means mechanically coupled to said plurality of probes for sensing probe displacement of any one of said probes;

first and second indicating means;

first and second actuating means mechanically connected to said sensing means for actuating said first and second indicating means, respectively, whereby said first actuating and indicating means is actuated upon any tire rolling over said plurality of probes and said second actuating and indicating means is actuated upon the tread depth of said tire being over a predetermined minimum; said second actuating means being operable to disconnect said first indicating means;

third and fourth indicating means connected to a switching means, timing means connected for activation to said first and second actuating means and to said switching means for switching said first and second actuating means from said first and second indicating means to said third and fourth indicating means upon being activated by said timing means, and temperature compensating means mechanically coupled to said sensing means for automatically compensating said sensing means for any physical variations due to a change in ambient temperature.

2. The automatic tire tread gauge of claim 1 wherein said sensing means comprises a cord line spring mounted and mechanically coupled to said probes whereby said cord line is deflected by an amount proportional to deflection of said probes.

3. The automatic tire tread gauge of claim 2 wherein said actuating means comprises first and second cams mounted in said cord line and first and second switches mounted in operating proximity to said first and second cams respectively.

4. An automatic tire tread gauge for sensing and indicating the tread condition of tires comprising a plurality of probes positioned for entrance into one or more tread grooves of a tire on an automobile rolling over said probe means;

sensing means mechanically coupled to said plurality of probes for sensing probe displacement of any one of said probes;

first and second indicating means;

first and second actuating means mechanically connected to said sensing means for actuating said first and second indicating means respectively whereby said first indicating means is actuated upon any tire rolling over said plurality of probes and said second indicating means is actuated upon the tread depth of said tire being over a predetermined minimum, said second actuating means being operable to disconnect said first indicating means.

5. The automatic tire tread gauge of claim 4 wherein said sensing means comprises a cord line spring mounted and mechanically coupled to said probes whereby said cord line is deflected by an amount proportional to deflection of said probes.

6. The automatic tire tread gauge of claim 5 wherein said actuating means comprises first and second cams mounted on said cord line and first and second switches mounted in operating proximity to said first and second cams, respectively.

7. An automatic tire tread gauge for sensing and indicating the tread condition of tires comprising a plurality of probes positioned for entrance into one or more tread grooves of a tire on an automobile rolling over said probe means;

sensing means mechanically coupled to said plurality of probes for sensing probe displacement of any one of said probes;

first and second indicating means;

first and second actuating means mechanically connected to said sensing means for actuating said first and second indicating means respectively whereby said first indicating means is actuated upon any tire rolling over said plurality of probes and said second actuated indicating means is actuated upon the tread depth of said tire being over a predetermined minimum;

third and fourth indicating means connected to a switching means timing means connected to said first and second actuating means and said switching means for switching said switching means from said first and second actuating means to said third and fourth indicating means upon being activated by said timing means.

8. The automatic tire tread gauge of claim 7 wherein said sensing means comprises a cord line spring mounted and mechanically coupled to said probes whereby said cord line is deflected by an amount proportional to deflection of said probes.

9. The automatic tire tread gauge of claim 8 wherein said actuating means comprises first and second cams mounted on said cord line and first and second switches mounted in operating proximity to said first and second cams, respectively.

References Cited by the Examiner

UNITED STATES PATENTS 2,313,156  3/43  Kratt _____ 73—146

NEIL C. READ, *Primary Examiner.*